United States Patent [19]

Ito et al.

[11] Patent Number: 5,445,511
[45] Date of Patent: Aug. 29, 1995

[54] CORE PUSH-OUT APPARATUS

[75] Inventors: Susumu Ito; Katsuyuki Yamanaka, both of Oshino; Akira Kouketsu, Komaki; Kazunari Ijima, Oshino, all of Japan

[73] Assignee: Fanuc Ltd., Yamanashi, Japan

[21] Appl. No.: 196,119

[22] PCT Filed: Jun. 10, 1993

[86] PCT No.: PCT/JP93/00775
§ 371 Date: Feb. 16, 1994
§ 102(e) Date: Feb. 16, 1994

[87] PCT Pub. No.: WO93/25363
PCT Pub. Date: Dec. 23, 1993

[30] Foreign Application Priority Data

Jun. 18, 1992 [JP] Japan .................................. 4-184331

[51] Int. Cl.⁶ .................. B29C 33/30; B29C 45/36
[52] U.S. Cl. ........................... 425/183; 249/102; 425/185; 425/186; 425/192 R; 425/193; 425/577
[58] Field of Search ........... 425/183, 185, 186, 192 R, 425/577, 808, 193; 249/102

[56] References Cited

U.S. PATENT DOCUMENTS

| | | | |
|---|---|---|---|
| 4,684,101 | 8/1987 | Wagner et al. | 425/193 |
| 4,820,149 | 4/1989 | Hatakeyama et al. | 425/577 |
| 4,861,254 | 8/1989 | Takeuchi et al. | 249/102 |
| 4,959,007 | 9/1990 | Okuyama | 425/577 |
| 5,049,344 | 9/1991 | Sorensen | 425/577 |
| 5,112,207 | 5/1992 | Pinsonneault | 425/577 |
| 5,246,362 | 9/1993 | Kobayashi et al. | 425/183 |
| 5,282,733 | 2/1994 | Noritake et al. | 425/183 |

FOREIGN PATENT DOCUMENTS

| | | | |
|---|---|---|---|
| 3545792 | 7/1986 | Germany | 425/183 |
| 57-6738 | 1/1982 | Japan . | |
| 61-53213 | 11/1986 | Japan . | |
| 63-76356 | 5/1988 | Japan . | |
| WO87/02306 | 4/1987 | WIPO | 425/183 |

OTHER PUBLICATIONS

Japanese Patent Abstract, vol. 15, No. 171, Apr. 1991 & JP-A-03 036 009, Toshiba Corp., Feb. 1991.
Japanese Patent Abstract, vol. 16, No. 250, Jun. 1992 & JP-A-04 059 321, Seikosha K.K., Feb. 1992.
Japanese Patent Abstract, vol. 17, No. 664, Dec. 1993 & JP-A-05 220 750, Fanuc Ltd., et al., Aug. 1993.

Primary Examiner—Khanh P. Nguyen
Attorney, Agent, or Firm—Staas & Halsey

[57] ABSTRACT

This apparatus, preferably applicable to a molding machine using the core change type dies, is capable of pushing out the inserted core from the mother mold, thereby facilitating the core extracting operation by the robots. A mother mold of a complementary die in the core change type dies is constituted by a main body and an intermediate plate which is disposed behind the main body and to be movable in both the forward and backward directions. A core fixing and releasing mechanism is provided on the intermediate plate. Furthermore, there is provided a push-out device disposed in a clearance formed between the main body and the intermediate plate when the intermediate plate is shifted rearward. The push-out device has its one surface abutting on a front surface of a core and its another surface abutting on a rear surface of the main body. The push-out device is attached to a distal end of an arm of a robot, combined with a molding machine, so that the push-out device is slidable in both the forward and backward directions and is urged rearward, if necessary.

5 Claims, 6 Drawing Sheets

CORE PUSH-OUT APPARATUS

TECHNICAL FIELD

The present invention relates to a cope push-out apparatus used in a cope extraction mechanism, which is mandatory for automatic molding operation of a molding machine using a cope change type dies.

BACKGROUND ART

In molding operations using metal molds, especially in the case of molding operation for many different small-lot products, the core change type dies are normally used for the efficiency of die changing operation. These type of dies comprise a stationary die and a movable die. The stationary die consists of a stationary mother mold and a stationary cope detachably coupled with the stationary mother mold, whereas the movable die consists of a movable mother mold and a movable cope detachably coupled with the movable mother mold. These stationary and movable dies ape paired when used in the molding operation. These stationary die and movable die cooperate with each other fop a common function.

Conventionally, the core change has been be changed by manual operation. For facilitating such manual die changing operation, however, in many instances, so-called rectangular cassette type copes, which allow an operator to insert or eject the core in a direction normal to the closing direction of the dies, have been used. Beside these rectangular cassette type cores, there are rounded cassette type cores which allow an operator to insert or eject the core into a mother mold in the same direction as the closing direction of the dies. These rounded cassette type cores are advantageous due to their compactness in size and lightness in weight, but are disadvantageous due to a lack in adequate hold for the operator, in extracting them.

The rectangular cassette type cores are too heavy to handle with a robot, and so the rounded cassette type cores, being compact and light, will be preferable for automation of the molding operation, although they are as equally difficult to handle, as in the case of manual handling. This is true especially when a parting surface of the mother mold and a parting surface of the core are substantially flush with each other, and, in such a case, it is almost impossible to extract the core from the mother mold by the robot hand. To overcome this problem, it can be considered to provide a means for pushing the core from behind. Such a means, however, is not applicable to a part such as the stationary die of the molding machine where a sprue bushing or the like is located, because it is difficult to push a core by means of a mechanism at a stationary side, although applicable to a part such as the movable die of the molding machine which structurally permits the installation of an ejector or spring.

DISCLOSURE OF INVENTION

An object of the present invention is to provide an apparatus preferably applicable to a molding machine using the core change type dies and capable of pushing out the core from the mother mold, thereby facilitating the core extracting operation by the robots.

In order to accomplish the above purpose, a first aspect of the present invention provides a core push-out apparatus including a mother mold of a complementary die in the core change type dies. The said mother mold includes a main body and an intermediate plate disposed behind the main body to be movable in both the forward and backward directions. Additionally, a core fixing and releasing mechanism is provided on the intermediate plate and a pushout device is disposed in a clearance formed between the main body and the intermediate plate when the intermediate plate is shifted rearward. The said push-out device has one surface abutting on a front surface of a core and another surface abutting on a rear surface of the main body.

It is preferable that said push-out device is attached to a distal end of an arm of a robot provided together with a molding machine, and that said push-out device is slidable in both the forward and backward directions and is urged rearward.

Furthermore, it is preferable that a robot includes an actuator and an arm, said actuator including a cylinder and a piston, and said actuator being disposed so that the axial line of its piston is parallel to the upper surface of the platen; a base end of the arm is supported on the upper surface of the platen swingably in an up-and-down direction; and an end of the piston and the base end of the arm are connected to allow the arm swing motion.

Still further, a preferable mode of the present invention provides a core push-out apparatus for a molding machine including core change type dies including a stationary die and a movable die. The stationary die consists of a stationary mother mold and a stationary core detachably assembled with said stationary mother mold, and said movable die consists of a movable mother mold and a movable core detachably assembled with said movable mother mold. The stationary mother mold includes a main body of the mother mold and an intermediate plate, the stationary mother mold consisting of a main body and an intermediate plate which is disposed to confront the movable die and designed to be driven in a direction of approaching to and separating from the movable die. The intermediate plate is formed with a hole into which the stationary core is freely inserted, and is equipped with a stationary core engaging and disengaging mechanism which engages with the stationary core inserted in said hole and fixes said stationary core to said intermediate plate. The movable mother mold of said movable die includes a core ejector and a movable core engaging and disengaging mechanism, said core ejector pushing out the movable core inserted in the movable mother mold toward the stationary die, and said movable core engaging and disengaging mechanism engaging with the movable core to fix the movable core at one position where an edge surface of the movable core is flush with a surface of the movable mother mold and at another position being offset from said one position toward said stationary die. An arm actuating mechanism places a distal end of an arm in a space formed between said intermediate plate and the main body of the mother mold when said intermediate plate is shifted toward the movable die, or retracting the distal end from said space. A core push-out device connected to said distal end of said arm, said core push-out out device having one side abutting on said main body of the mother mold of said stationary die and the other side abutting on the movable core inserted in the hole of the intermediate plate, occupying a predetermined width in a shifting direction of the movable die. A core holding device holds the stationary core and the movable core abutting on each other and transfers these stationary core and movable core together toward the movable die when said stationary core is slightly pushed out from the intermediate plate toward the movable die by the core push-out device.

Yet further, another aspect of the present invention provides a core push-out apparatus qualifying as a device for pushing out cores in core change type dies, said core push-out apparatus including a wedge cam provided with a mother mold of complementary dies, said wedge cam being slidable in a direction normal to the direction of insertion of a core and contacting with said core and an actuating mechanism for moving said wedge cam.

As described in the foregoing, the present invention makes it easier for a robot hand to hold even the round cassette type core, thereby enabling the robot to perform automatic change operation for this kind of cores.

BEST MODE FOR CARRYING OUT THE INVENTION

Figure 1:
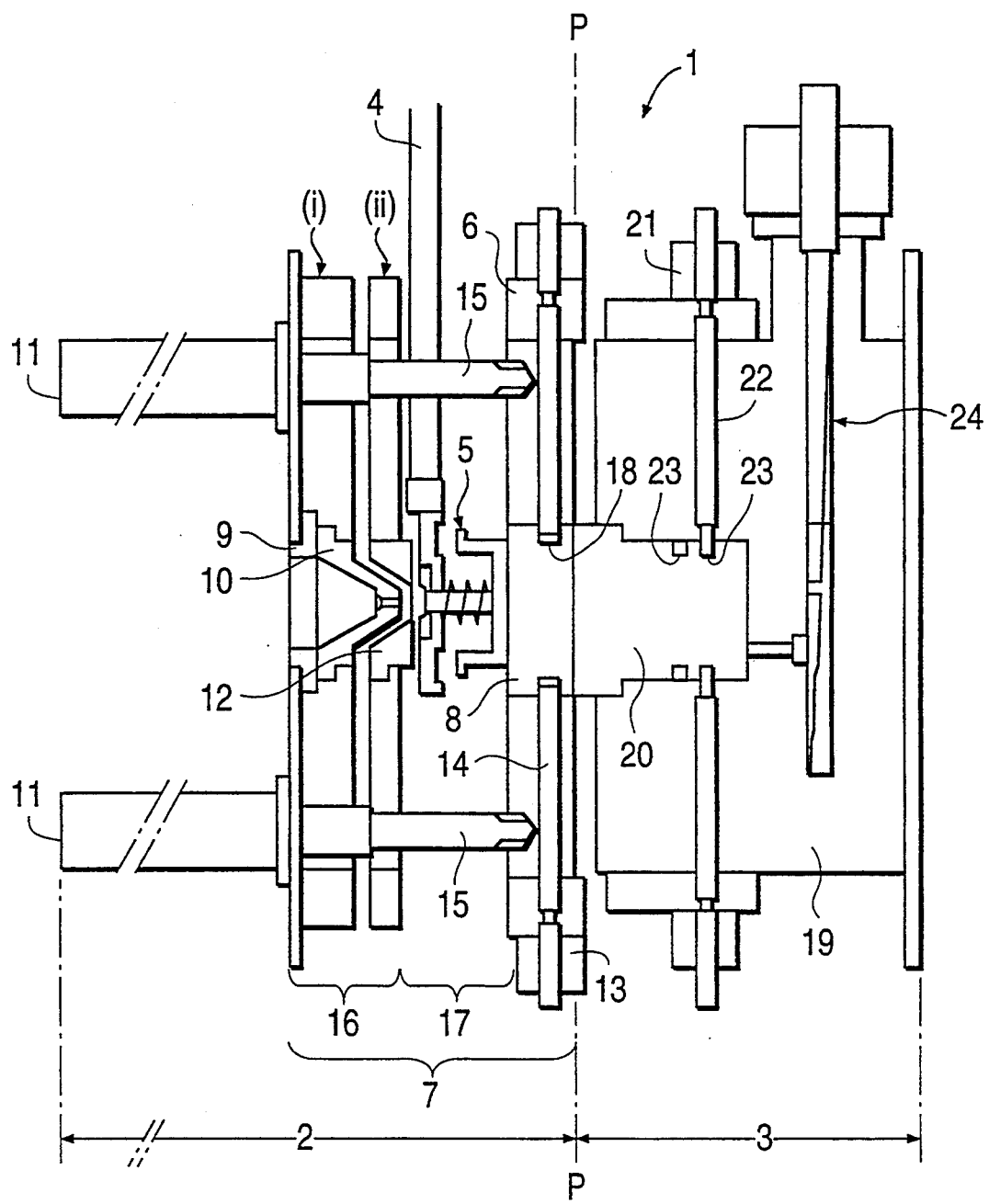
FIG. 1 is a cross-sectional view schematically showing a core push-out apparatus in accordance with a first embodiment of the present invention.

FIG. 1 shows core change type dies 1 used in an injection molding machine, which consists of a stationary die 2 and a movable die 3 facing each other with a parting line P lying therebetween. These stationary die 2 and the movable die 3 are paired to constitute the complementary dies. A reference numeral 4 represents a robot hand used in the core extracting operation. A distal end of the robot hand 4 is connected to a push-out device 5. This injection molding machine is equipped with a core extracting robot.

The stationary die 2 includes a stationary mother mold 7 and a stationary core 8. The stationary mother mold 7 consists of a primary plate (i), a secondary plate (ii), and an intermediate plate 8. The primary plate (i) has a locating ring 9 and a sprue bushing 10 provided at the center thereof and two air actuators 11 disposed at its front side symmetrically about the center of the primary plate (i). The secondary plate (ii) has a secondary bushing 12 provided at the center thereof. The intermediate plate 8 has a stationary core 8 inserted into the center thereof and a core fixing and releasing mechanism 14 for the stationary core 8, which is driven by a solenoid The air actuator 11 has a piston 15 having two different diameters and passing through the primary plate (i) and the secondary plate (ii), and a distal end of the piston 15 is fixed to the intermediate plate 8. When the air actuators 11 are activated to extend the piston 15, the intermediate plate 8 is shifted rearward (i.e. toward the movable die 3) to cause a clearance 17 to be formed against the mother mold body 18 consisting of intermediate plate 8 and a mother mold main body 18, which consists of the primary and secondary plates (i) and (ii). After the intermediate plate 6 is sufficiently shifted, each larger diameter portion of the pistons abuts on the front surface of the secondary plate (ii) to cause the secondary plate (ii) to be slightly separated from the primary plate (i), thereby cutting the sprue.

The stationary core 8 has a circular cross section and is engaged with the intermediate plate 8 so as to be detachable in both the forward and backward directions. This stationary core 8 has a circumferential side surface with an engaging groove 18, into which a claw of the core fixing and releasing mechanism 14 enters.

The movable die 3 includes a movable mother mold 19, a movable core 20 coupled with the movable mother mold 19 to be detachable in both the forward and backward directions, and a core fixing and releasing mechanism which is to be activated by the solenoids 21 to cause the movable core 20 to be fixed to or released from the movable mother mold 19. Reference numeral 23 represents two (i.e. front and rear) engaging grooves, either one of which engages with a claw of the core fixing and releasing mechanism 22. Furthermore, a reference numeral 24 represents a part of an ejector device for ejecting a molded product and pushing out the movable core. The stationary core 8 and the movable core 20 constitute a pair of rounded cassette type cores.

The embodiment of the present invention described in the following relates to a core extraction apparatus, more particularly to a core push-out apparatus applied to the stationary die 2. Therefore, the movable mother mold 19 and the push-out mechanism of the movable core will not be explained in detail (For the detailed description, refer to the Unexamined Japanese Patent Application No. HEI 4-56345/1992).

Figure 2:
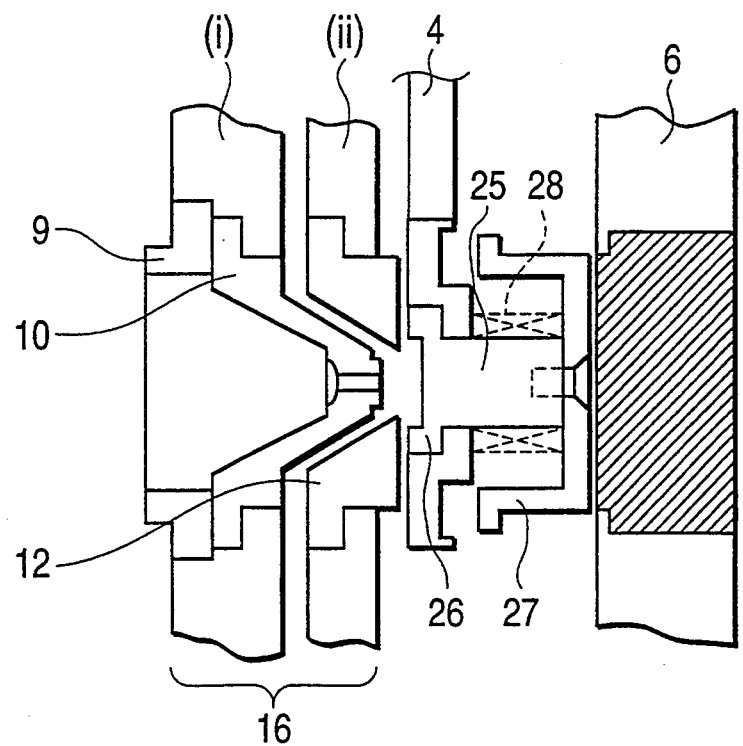
FIG. 2 is a view showing an essential part of the core push-out apparatus shown in FIG. 1.

The push-out device 5 as shown in FIG. 2, comprises a shaft portion 25, a flange portion 26 connected to the front end of the shaft portion 25, and a receiving portion 27 connected to the rear end of the shaft portion 25. The push-out device 5 is in contact, but slidably in both forward and backward directions, with the distal end of the robot hand 4. A reference numeral 28 represents a spring which is interposed between the distal end of the robot hand 4 and the receiving portion 27, thereby constantly urging the push-out device 5 rearward. The flange portion 26 has a surface abutting on the rear surface of the main body 16 of the stationary mother mold 7. The receiving portion 27 has a surface abutting on the front surface of the stationary core 8.

Figure 4:
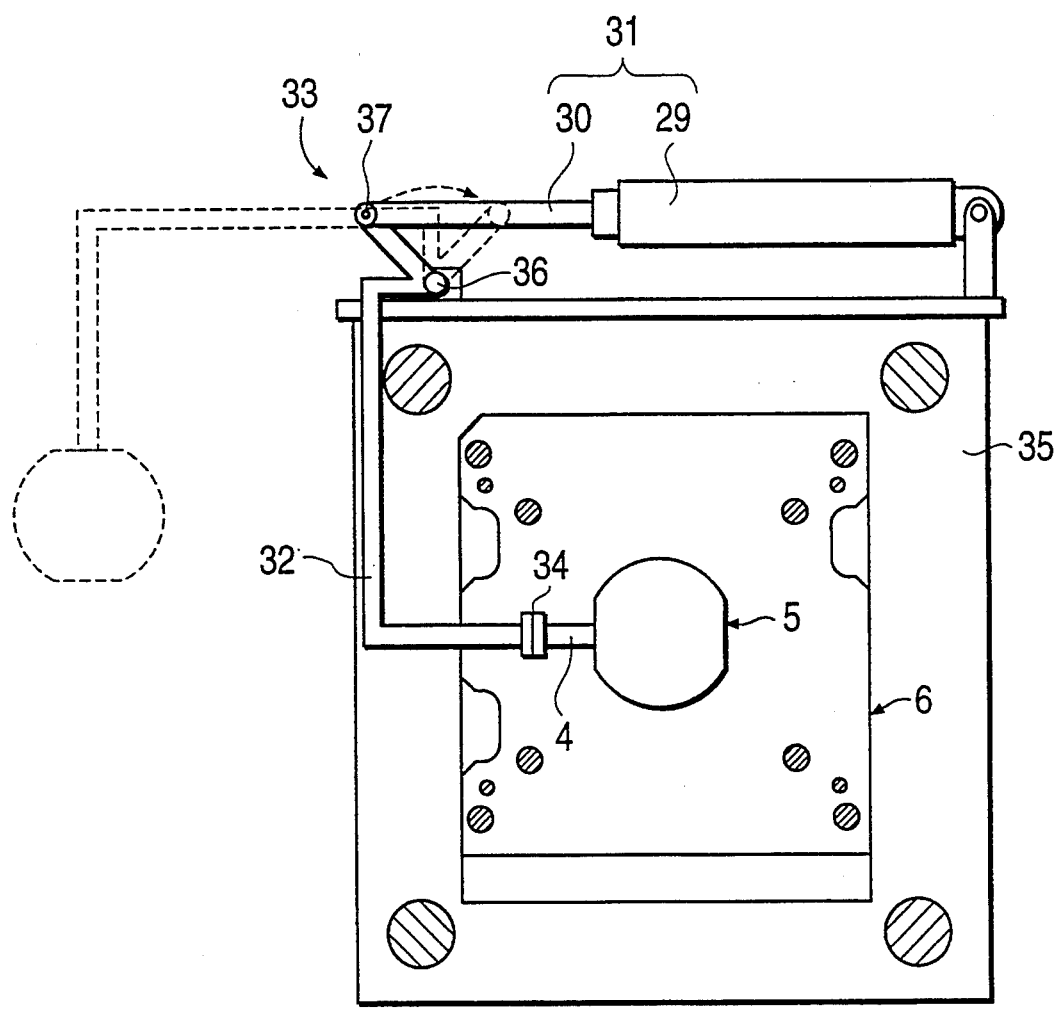
FIG. 4 is a side view showing the core push-out apparatus of FIG. 1.

As shown in FIG. 4, the robot hand 4 is mounted on the distal end of an arm 32 of a core push-out robot 33 through a hand changer 34. The core push-out robot 33 comprises an actuator 31, which consists of a cylinder 29 and a piston 30, and an arm 32. The actuator 31 is disposed on the upper surface of a stationary platen 35 of the injection molding machine in such a manner that the axis of the piston 30 is parallel to the upper surface of the platen 35. The robot arm 32 has a base end hingedly supported on a shaft 36 provided on the upper surface of the platen 35, thereby enabling the arm to swing in an up-and-down direction. The distal end of the piston 30 and the base end of the robot arm 32 are connected with each other so that their connecting point rotates about the shaft 37.

During the injection molding operation, the stationary core 8 is installed in the intermediate plate 6 of the stationary die 2 and fixed by the core fixing and releasing mechanism 14 (FIG. 1). The air actuators 11 pull the intermediate plate 6 and the secondary plate (ii) together towards the primary plate (i) so that opening and closing operations with respect to the movable die 3 are executed under the condition where the primary plate (i), secondary plate (ii), and the intermediate plate 6 are in contact with one another. The push-out device 5, connected to the robot hand 4, is in a retracted position (indicated by dotted line of FIG. 4) by being mounted on the arm 32 of the core push-out robot 33.

Figure 5:
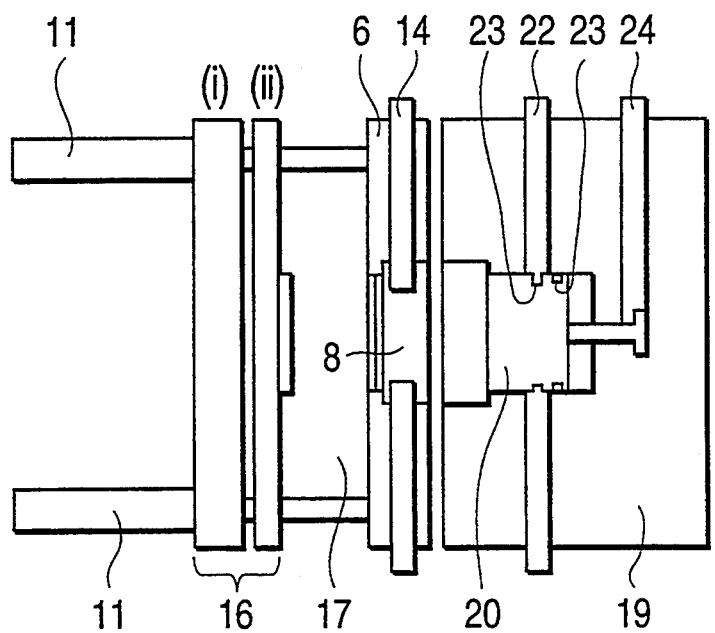
FIG. 5 is a front view showing a first operating motion as a part of the core changing operation by the core push-out apparatus shown in FIG. 1.

After a required molding for any lot is completed, the core changing operation is carried out in the following manner:

The movable die 3 is retracted to a die opening position. The air actuators 11 are activated in the normal direction, and the intermediate plate 6 and the secondary plate (ii) are shifted rearward. The shift of the secondary plate (ii) is very small, and the clearance 17 is formed between the secondary plate (ii) and the intermediate 6, i.e., between the main body 16 and the intermediate plate 6 (FIG. 5). In response to the rearward movement of the secondary plate (ii), a sprue remaining in the sprue bushing is cut away and removed.

Figure 6:
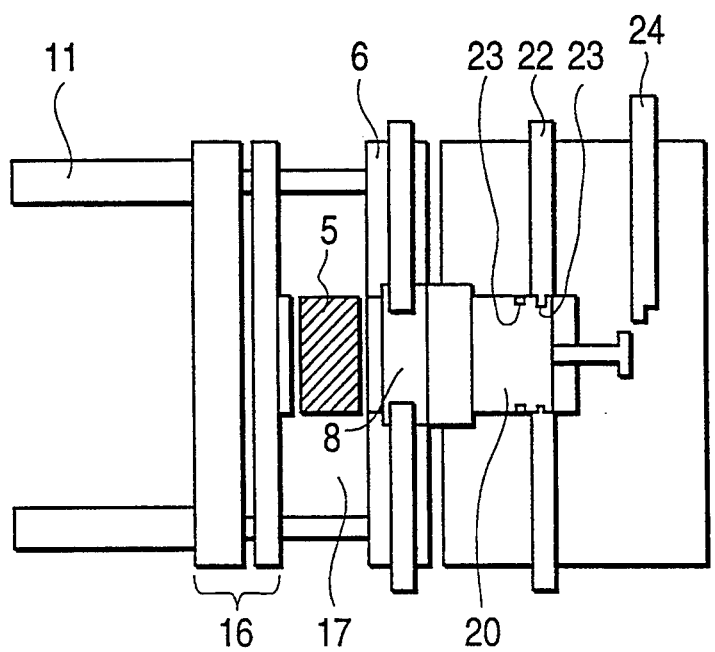
FIG. 6 is a front view showing a second operating motion of the same.

As shown in FIG. 4, upon activation of the actuator 31 of the core push-out robot 33, the piston 30 protrudes forward. This causes the arm 32 to rotate about the shaft 38 of the arm 32. Thus, the push-out device 5 connected to the distal end of the robot hand 4 is transferred into the clearance 17 (FIG. 1). The push-out device 5 is, therefore, placed between the front surface of the stationary core 8 and the rear surface of the main body 16, that is, between the stationary core 8 and the secondary bushing 12. At the same time, on the side of the movable die 3, the core fixing and releasing mechanism 22 of the movable die 3 releases the movable core 20, and then the movable core 20 is pushed forward by the ejector device 24 until its parting surface abuts on the parting surface of the stationary core 8 (FIG. 6). Then, the core fixing and releasing mechanism 22 engages with the rear engaging groove 23 formed on the movable core 20.

Figure 3:
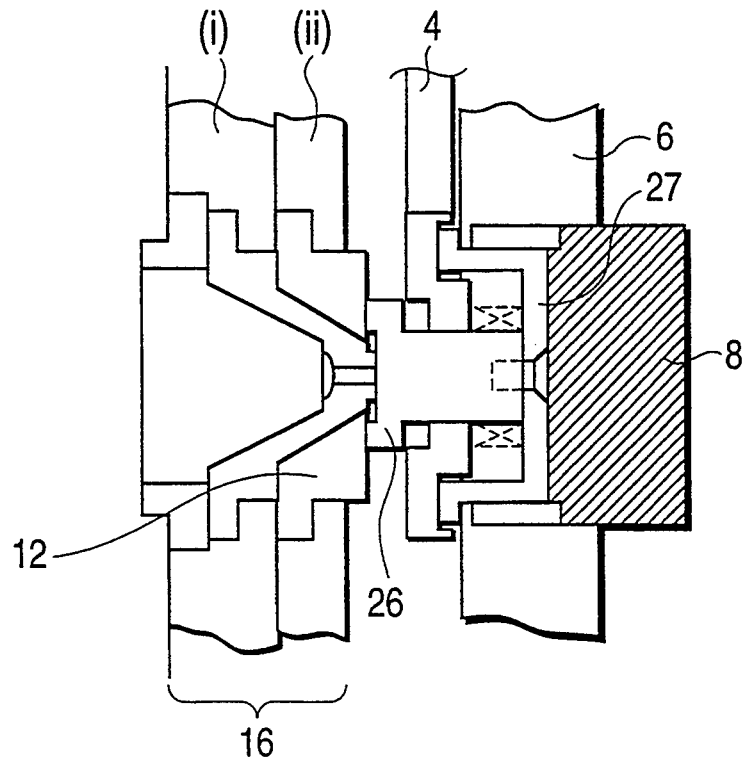
FIG. 3 is a view showing a condition where a core is pushed out by the core push-out apparatus shown in FIG.
Figure 7:
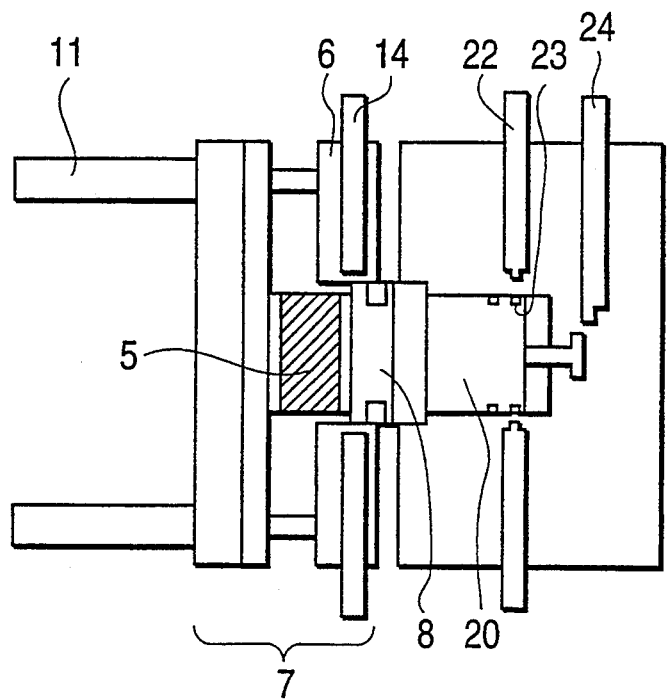
FIG. 7 is a front view showing a third operating motion of the same.
Figure 8:
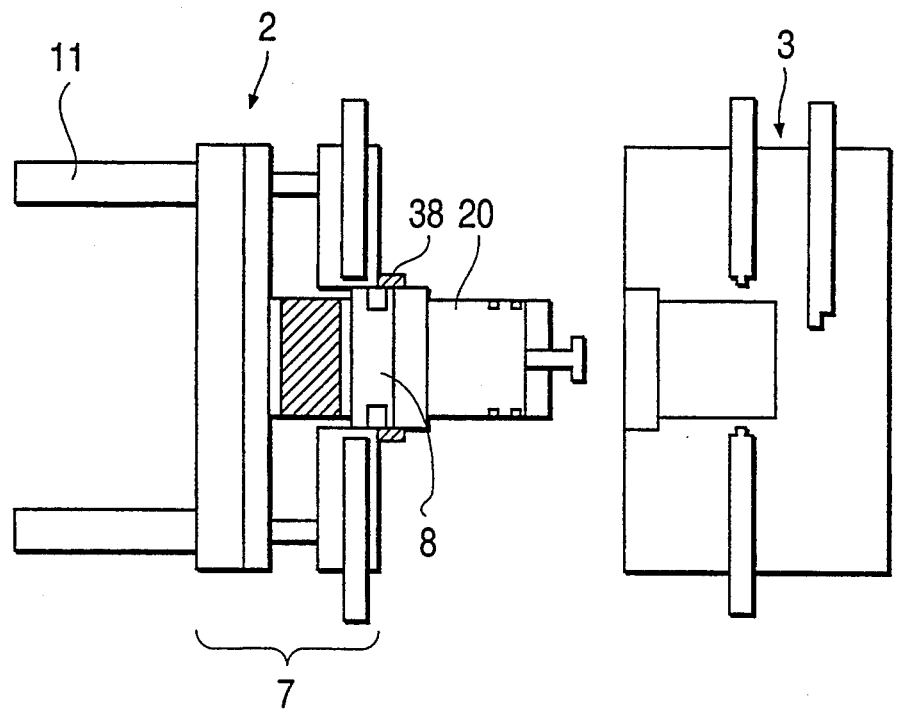
FIG. 8 is a front view showing a fourth operating motion of the same.

The core fixing and releasing mechanism 14 of the stationary core 8 releases the stationary core 8, and the movable die 3 is shifted forward. The air actuators 11, are brought into a free condition, whereby the movable core 20 pushes the stationary core 8, and the front surface of the stationary core 8 abuts on the receiving portion 27 of the push-out device 5. Then, the push-out device 5 is shifted forward against the spring 28 (shown in FIG. 2) until the flange portion 26 abuts on the front surface of the secondary bushing of the main body 18. The secondary plate (ii) is pushed and abuts on the primary plate (i) (FIGS. 3 and 7).

The air actuators 11 are activated in the reverse direction to cause the intermediate plate 6 to be drawn forward. Thus, the stationary core 8 relatively moves backward with respect to the intermediate plate The parting surfaces of the stationary core 8 and the movable core 20 are, therefore, positioned within a clearance between the intermediate plate 6 and the parting line of the movable mother mold 19. The core fixing and releasing mechanism 22 and the ejector device 24 of the movable die 3 release the movable core 20 (FIG. 7).

The hand 38 of the core changing robot, provided independently in the injection molding machine, holds these stationary core 8 and the movable core 20 at a time on the parting line.

The movable die 3 retracts to separate the movable core 20 from the movable die 3. Then, the hand 38 of the core changing robot moves rearward so that the cores are entirely pulled out from the stationary mother mold 7. In this manner, the stationary and movable cores 8 and 20 are extracted from their mother molds 7 and 19, respectively in order to be stored in a predetermined place such as a core storage device.

The receiving portion 27 of the push-out device 5 returns to its home position being urged by the spring 28. Then, the air actuators 11, are again activated in the normal direction to cause the intermediate plate 6 to be shifted rearward. Then, the push-out device 5 is transferred to its retracted position by the actuator 31 of the core push-out robot 33.

Operation for installing the cores into the mother molds will not be described since it is not directly related to the present invention.

For the previously described embodiment, especially for the stationary core 8, the stationary core 8 is inserted into the intermediate plate 6 of the stationary mother mold 7 in a fashion that the parting surface of the stationary core 8 is substantially flush with the parting surface of the intermediate plate 6; however, by virtue of the intermediate plate being driven forward or backward and the action of the push-out device 5, the stationary core 8 is caused to project to an extent that allows the core changing robot hand 38 to easily hold the projected portion of the stationary core 8. This enables sure extraction and change of the core. Besides, according to this embodiment, the core push-out robot 33 for actuating the core push-out device 5 comprises a cylinder 29 and a piston 30, which constitute the actuator 31, are horizontally disposed on the upper surface of the stationary platen 35 and will not extend upward, thereby not adversely affecting the layout plan of the factory.

Furthermore, as described previously, the push-out device 5 is slidable back and forth, so that the load on the hand 4 and the arm 32 will be small, since they are subjected to only the reaction force of the spring 28.

Figure 9:
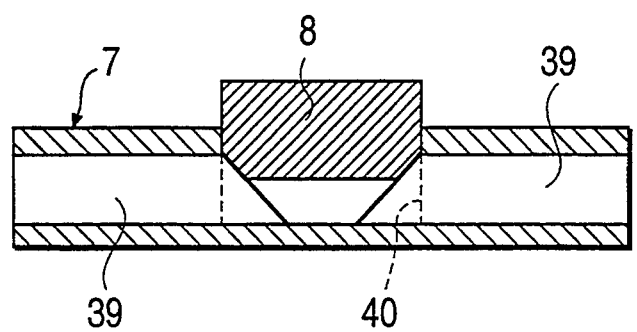
FIG. 9 is a cross-sectional view showing an essential part of a core push-out apparatus in accordance with a second embodiment of the present invention, wherein a core is pushed out.
Figure 10:
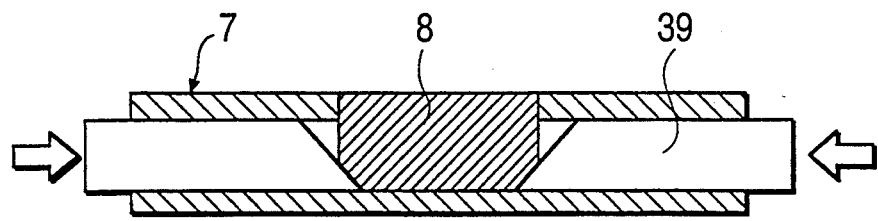
FIG. 10 is a perspective view showing a condition where the core is placed in a stationary mother mold in the core push-out apparatus of FIG. 9, seen from the front side.

FIGS. 9 and 10 show the second embodiment of the present invention, which is characterized by use of a pair of wedge cams 39. The wedge cams 39 have opposing ends with inclined surfaces so that, when the wedge cams 39 are brought closer, these inclined surfaces cooperatively push the stationary core 8 rearward (upward in the drawing). These wedge cams 39 are disposed confronting the stationary mother mold 7, and are slidable in the direction normal to the direction of insertion of the stationary core 8 by the pushing force from a driving mechanism or a robot hand. Although not shown in the drawing, the driving mechanism will comprise air actuators, solenoids, and motors.

When the wedge cams 39 are pushed to come closer to each other while the stationary core 8 is installed in the stationary mother mold 7, the stationary core 8 is pushed out rearward by the inclined surfaces of the wedge cams 39.

Figure 11:
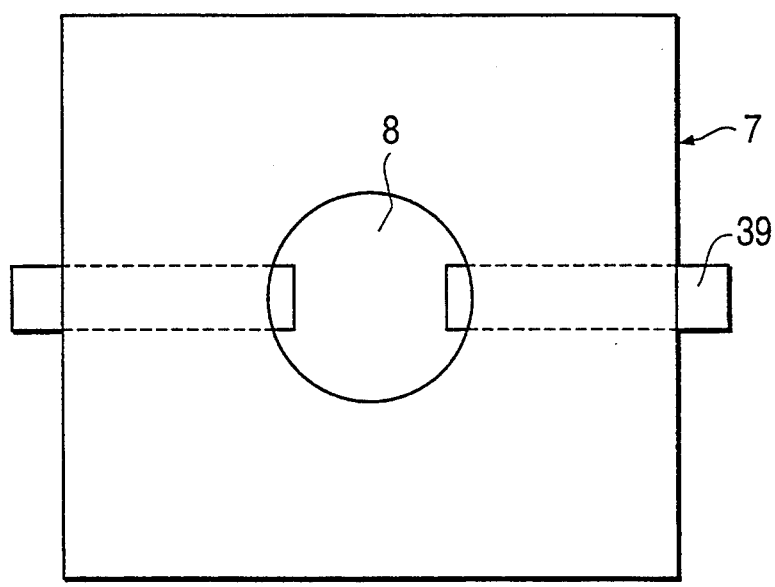
FIG. 11 is a side view of the core push-out apparatus shown in FIG. 10.

The front surface of the stationary core 8 has inclined surfaces fitted to the inclined surfaces of the wedge cams 39. Thus, if the stationary core 8 is pressed down, the wedge cams 39 are returned to their home positions. When the stationary core 8 is pushed to reach a predetermined position, the core fixing and releasing mechanism 14 is activated in the same manner as the previous embodiment, thereby preventing the falling off of the stationary core 8. Although the stationary mother mold 7 is in an extremely simplified form in FIGS. 9 to 11, this stationary mother mold 7 has structure and function equivalent to the conventional stationary mother mold.

This second embodiment is simple in structure, so that it can be composed at low cost.

The present invention is not limited to an injection molding machine or to the specific structures of the above-explained embodiments. For example, the push-out device 5 can be either fixedly installed on the robot hand 4 or disposed in the clearance 17 by the hand of the core changing robot.

The terms "stationary" and "movable" are relative terms with respect to the dies, mother molds, and cores. Therefore, the present invention can be applied to any of the stationary and movable portions. Moreover, the "front" and "rear" directions are designated merely for the convenience in explaining the invention.

We claim:

1. A core push-out apparatus for a core changing type die comprising:
   a first complementary die,
   a second complementary die, and
   a clearance being defined therebetween,
   said first complementary die having a mother mold for holding a core in a chamber formed in the mother mold, the mother mold comprising:
   a main body;
   an intermediate plate disposed behind and coupled to the main body, the clearance being formed between the main body and the intermediate plate, the intermediate plate being capable of being driven in both a forward direction toward the main body and a backward direction away from the main body for decreasing and increasing the clearance, respectively, said intermediate plate including a core fixing and releasing mechanism for fixing and releasing the core to and from the intermediate plate during selected operations; and
   a push-out device having a body disposed in the clearance formed between the main body and the intermediate plate, said push-out device having a first surface abutting a front surface of the core and a second surface abutting a rear surface of the main body and said first surface being biased by an elastic means with respect to the body of the push-out device so as to push the core rearwardly.

2. A core push-out apparatus in accordance with claim 1, wherein said elastic means is a spring.

3. A core push-out apparatus in accordance with claim 1, wherein said push-out device is attached to a distal end of an arm of the robot which is mounted on a molding machine so that said push-out device is movable both into said clearance and out of said clearance.

4. A core push-out apparatus in accordance with claim 1, wherein the robot comprises:
   a cylinder;
   a piston; and
   an arm;
   said cylinder being mounted on a plate of the molding machine and also being disposed so that an axial line of the piston is parallel to an upper surface of a platen of a molding machine;
   a base end of the arm being swingably supported on the upper surface of the platen, in a forward direction and a downward direction, and
   an end of the piston and the base end of the arm are coupled so as to allow a swing motion of the arm.

5. A core push-out apparatus for a molding machine comprising core change type dies, said core push-out apparatus comprising:
   a stationary die; and
   a movable die;
   said stationary die comprising a stationary mother mold and a stationary core detachably assembled with said stationary mother mold,
   said movable die comprising a movable mother mold and a movable core detachably assembled with said movable mother mold;
   said stationary mother mold comprising:
   a main body; and
   an intermediate plate,
   said intermediate plate serving as an intermediate supporting member which is disposed confronting the main body of the mother mold and capable of being driven in a forward direction toward the main body and a backward direction away from the main body; and
   said intermediate plate having a hole into which the stationary core is freely inserted, and an engaging and disengaging mechanism which engages with the stationary core inserted into said hole in order to fix said stationary core to said intermediate plate;
   said movable mother mold of said movable die comprising:
   a core ejector and
   a movable core engaging and discharging mechanism,
   said core ejector pushing out a movable core inserted into the movable mother mold toward the stationary die, and
   said movable core engaging and disengaging mechanism engaging with the movable core to fix the movable core at one of a first selected position where an edge surface of the movable core is flush with a selected surface of the movable mother mold and a second selected position which is offset from said first selected position in a direction toward said stationary die;
   said molding machine being provided with an arm actuating mechanism for causing a distal end of an arm to be one of placed in and retracted from a space formed between said intermediate plate and the main body of the stationary mother mold when said intermediate plate is driven in the backward direction, toward the movable die;
   a core push-out device connected to said distal end of said arm, said core push-out device having a first side abutting the main body of the stationary mother mold of said stationary die and a second side, opposing said first side, abutting the movable core inserted in the hole of the intermediate plate, thereby occupying a predetermined width in a direction of shifting of the movable die; and a core holding device provided for holding the stationary core and the movable core which abut each other and driving the stationary core and the movable core together in a backward direction toward the movable die, said stationary core being pushed out from the intermediate plate toward the movable die by the core push-out device when held to the movable core.

* * * * *